United States Patent
Dupuis et al.

(10) Patent No.: US 9,919,652 B2
(45) Date of Patent: Mar. 20, 2018

(54) AUTO-ADJUSTING SIDE-VIEW MIRRORS

(71) Applicant: FORD GLOBAL TECHNOLOGIES, LLC, Dearborn, MI (US)

(72) Inventors: Michael Dupuis, Sterling Heights, MI (US); David Joseph Orris, Allen Park, MI (US); Thomas Lorenzo, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 35 days.

(21) Appl. No.: 15/146,642

(22) Filed: May 4, 2016

(65) Prior Publication Data

US 2017/0320439 A1    Nov. 9, 2017

(51) Int. Cl.
*B60R 1/08* (2006.01)
*B60R 1/00* (2006.01)
*B60R 1/06* (2006.01)

(52) U.S. Cl.
CPC .............. *B60R 1/081* (2013.01); *B60R 1/002* (2013.01); *B60R 1/0612* (2013.01)

(58) Field of Classification Search
CPC ........ B60R 1/081; B60R 1/002; B60R 1/0612
USPC ............ 701/49; 349/843; 359/841, 872, 881
See application file for complete search history.

(56) References Cited

U.S. PATENT DOCUMENTS

| | | | |
|---|---|---|---|
| 4,679,158 A | 7/1987 | Tate | |
| 5,132,851 A | 7/1992 | Bomar et al. | |
| 5,980,048 A * | 11/1999 | Rannells, Jr. | ........... B60R 1/025 180/167 |
| 6,755,543 B1 | 6/2004 | Foote et al. | |
| 7,114,817 B2 | 10/2006 | Evans et al. | |
| 7,287,867 B2 | 10/2007 | Wellington et al. | |
| 2014/0139938 A1* | 5/2014 | Freytag | .................. B60R 1/078 359/844 |
| 2015/0066296 A1 | 3/2015 | Trombley et al. | |
| 2015/0344010 A1* | 12/2015 | Kurtovic | ............... B60T 8/1708 701/70 |

FOREIGN PATENT DOCUMENTS

WO          108926 A1    2/2001

* cited by examiner

*Primary Examiner* — Marthe Y Marc-Coleman
(74) *Attorney, Agent, or Firm* — Carlson, Gaskey & Olds

(57) ABSTRACT

A vehicle side-view mirror control system includes a pair of extendable side-view mirrors and a controller configured to receive and store one or more trailer identifying indicia and one or more predetermined extendable side-view mirror configurations. The controller is configured to control translation of at least one of the pair of side-view mirrors to a one of the one or more predetermined extendable side-view mirror configurations according to the one or more stored trailer identifying indicia. The one or more trailer identifying indicia define or identify a specific trailer having been previously towed by the vehicle.

20 Claims, 4 Drawing Sheets

AUTO-ADJUSTING SIDE-VIEW MIRRORS

TECHNICAL FIELD

This disclosure relates generally to adjustable vehicle side-view mirrors. More particularly, the disclosure relates to methods and systems for providing side-view mirror pre-set positions keyed to specific stored identifying indicia of trailers to be towed.

BACKGROUND

As is well-known, motor vehicles typically include side-view mirrors to provide the vehicle driver with a suitable field of view extending to the side and behind the vehicle. Conventionally, an orientation or angular position of the side-view mirror reflective surface is adjustable by pivoting to tailor the driver field of view as desired. For vehicles towing trailers, often such side view mirrors (also referred to as tow mirrors) are also equipped with mechanisms for longitudinally extending the side-view mirror, i.e. altering a distance from the vehicle side at which the mirror reflective surface is held. This allows adjusting the driver's field of view to accommodate the presence of vehicle-attached trailers of varying length and width dimensions. When the vehicle is not towing a trailer, the extendable side-view mirrors may be returned to an original configuration as specified by the driver. Such mechanisms for altering a side-view mirror length and/or orientation of the mirror reflective surface may be manually adjustable, or more conveniently may comprise powered mechanisms operable by the driver from the interior of the passenger cabin.

Most drivers will not tow a trailer with their vehicle all of the time, but instead will occasionally attach a trailer for recreational or work purposes. Alternatively, some drivers may tow a variety of trailers using the same vehicle. In each situation, the driver typically must adjust the extendable side view mirrors to provide a field of view to his or her satisfaction each time the trailer is attached to the vehicle. This can be inconvenient for the user. Moreover, this can be dangerous if the user neglects to make the needed adjustments to the side view mirror position prior to operating the vehicle with the trailer in tow.

To solve this and other problems, the present disclosure relates to vehicle tow mirror control systems and methods. Advantageously, the described systems and methods automatically adjust the vehicle side view mirrors to a predetermined extension length and/or reflective surface orientation in accordance with specific identifying indicia for a particular trailer being towed. Still more, such specific trailer identifying indicia are stored, and so by the simple expedient of approaching and/or attaching the specific trailer to the vehicle, the extendable side view mirrors are configured as to extension and reflective surface orientation to the user's particular specifications according to the stored trailer identifying indicia.

SUMMARY

In accordance with the purposes and benefits described herein, in one aspect a vehicle side-view mirror control system is described, comprising a pair of extendable side-view mirrors and a controller configured to receive and store one or more trailer identifying indicia and one or more predetermined extendable side-view mirror configurations. The controller is configured to control translation of at least one of the pair of side-view mirrors to a one of the one or more predetermined extendable side-view mirror configurations according to the one or more stored trailer identifying indicia. To accomplish this, the controller may be operatively linked to at least one motor which drives the translation of the at least one of the pair of extendable side-view mirrors to the one of the predetermined configurations. The one or more trailer identifying indicia define or identify a specific trailer having been previously towed by the vehicle.

In embodiments, the one or more predetermined extendable side-view mirror configurations includes one or both of a side-view mirror extension length and a side-view mirror reflective surface orientation. The side-view mirror reflective surface orientation may be determined in accordance with the specified side-view mirror extension length. In other embodiments, the one or more predetermined extendable side-view mirror configurations may be further keyed to a vehicle occupant identity.

In embodiments, the controller may be configured to determine the one or more predetermined trailer identifying indicia by way of a communication between the trailer and the vehicle when the trailer is attached to the vehicle. This communication may be by a wired connection or may be a wireless communication.

In another aspect, a method for controlling a vehicle extendable side-view mirror is provided, comprising communicating one or more trailer identifying indicia to a controller associated with the vehicle and, by the controller, translating at least one of a pair of extendable side-view mirrors to a predetermined configuration according to the one or more communicated trailer identifying indicia. This may include operatively linking the controller to at least one motor which drives the translation of the at least one of the pair of extendable side-view mirrors to the predetermined configuration. One or more trailer identifying indicia identifying a specific trailer having been previously towed by the vehicle may be communicated to the controller.

In embodiments, the described method includes translating the at least one of the pair of extendable side-view mirrors to the predetermined configuration comprising one or both of a side-view mirror extension length and a side-view mirror reflective surface orientation. This may further include determining the side-view mirror reflective surface orientation in accordance with the determined side-view mirror extension length. In embodiments the method further contemplates determining the predetermined configuration according to a vehicle occupant identity.

In embodiments, the method includes determining, by the controller, the one or more communicated trailer identifying indicia by way of a communication between the trailer and the vehicle when the trailer is attached to the vehicle. In embodiments the communication may be provided by a wired connection or as a wireless communication.

In the following description, there are shown and described embodiments of the disclosed vehicle side-view mirror control systems and methods. As it should be realized, the systems and methods are capable of other, different embodiments and their several details are capable of modification in various, obvious aspects all without departing from the devices and methods set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed vehicle side-view mirror control systems and methods, and together with the description serve to explain certain principles thereof. In the drawing.

Reference will now be made in detail to embodiments of the disclosed vehicle side-view mirror control systems and methods, examples of which are illustrated in the accompanying drawing figures.

DETAILED DESCRIPTION

Figure 1:
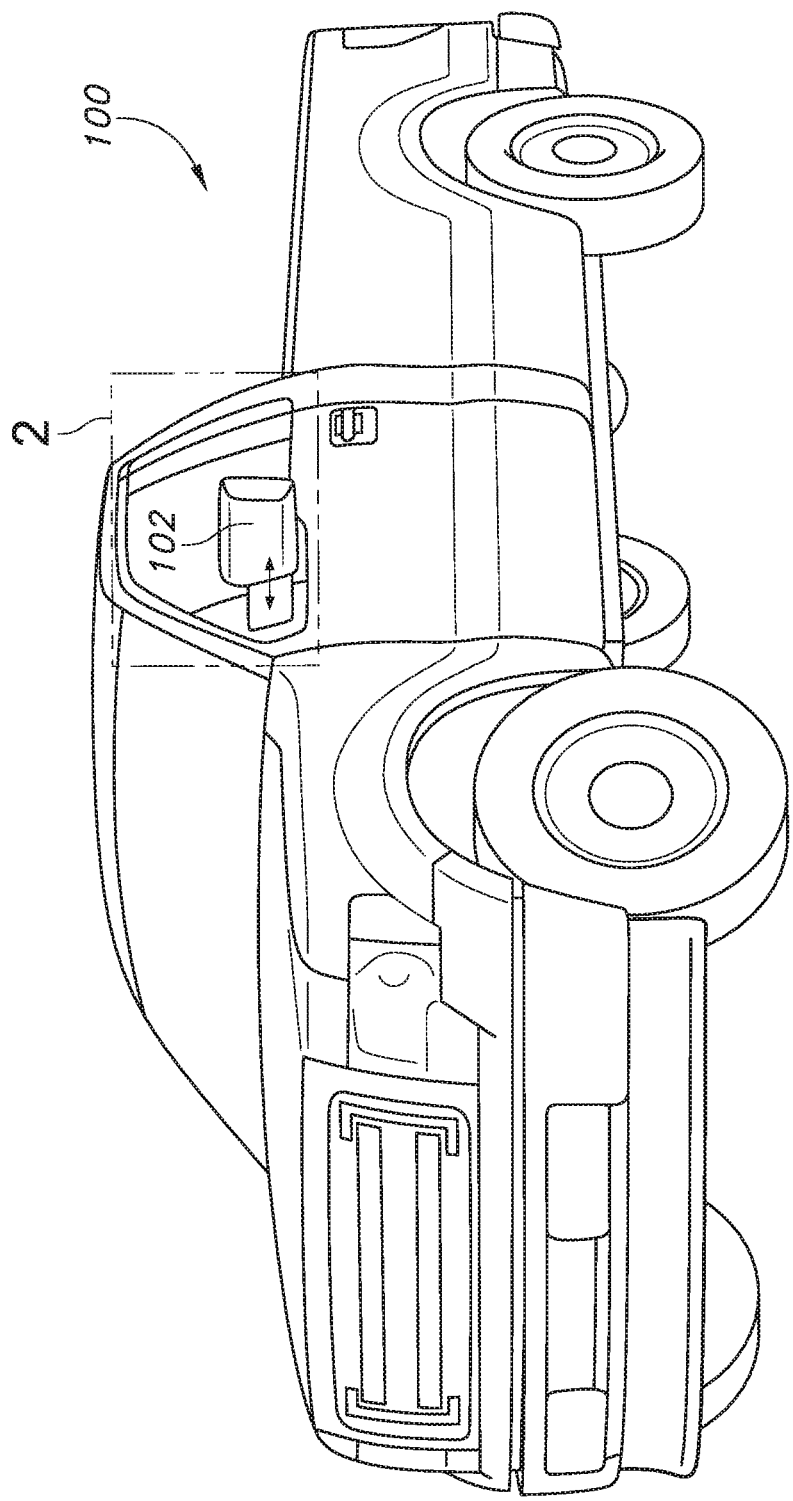
FIG. 1 depicts a vehicle including extendable side view mirrors.
Figure 2A:
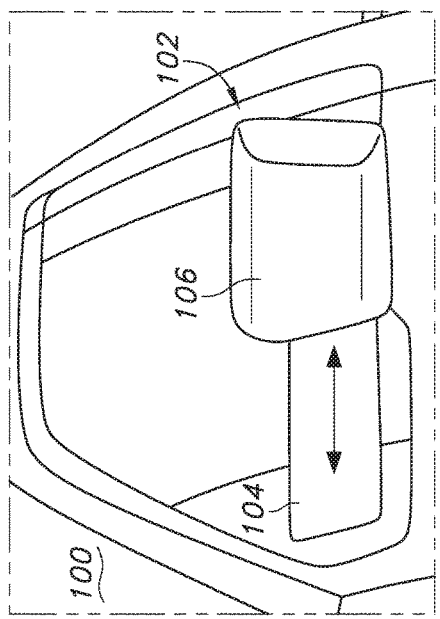
FIG. 2A shows an extendable side view mirror according to FIG. 1 in a retracted configuration.
Figure 2B:
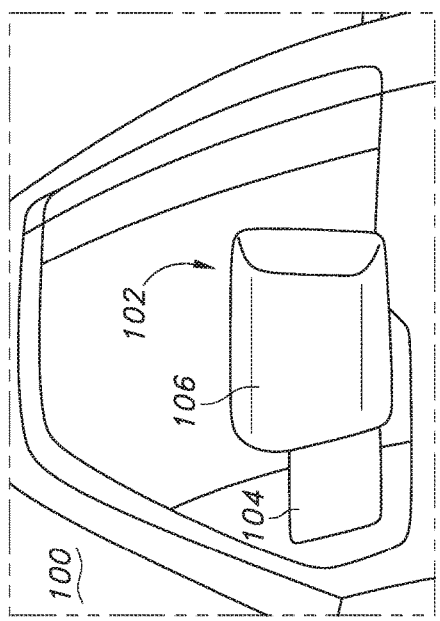
FIG. 2B shows the extendable side view mirror of FIG. 2A in an extended configuration.

FIG. 1 shows a vehicle 100, in the depicted embodiment being a pickup truck, including extendable side view mirrors 102 (only one shown in the depicted view) disposed on opposite sides of the vehicle. As shown in FIGS. 2A-2B, such extendable side view mirrors 102 include an extendable stalk 104 and a mirror housing 106. The stalk 104 is configured to extend and retract (see arrow in FIG. 2B) to alter a distance from the vehicle 100 at which the mirror housing 106 is held. The extendable stalk 104 may be configured for extending only between fully retracted and fully extended configurations as shown in FIG. 2B, or may be configured for extending to a plurality of intermediate configurations between the fully retracted and fully extended configurations.

Figure 2C:
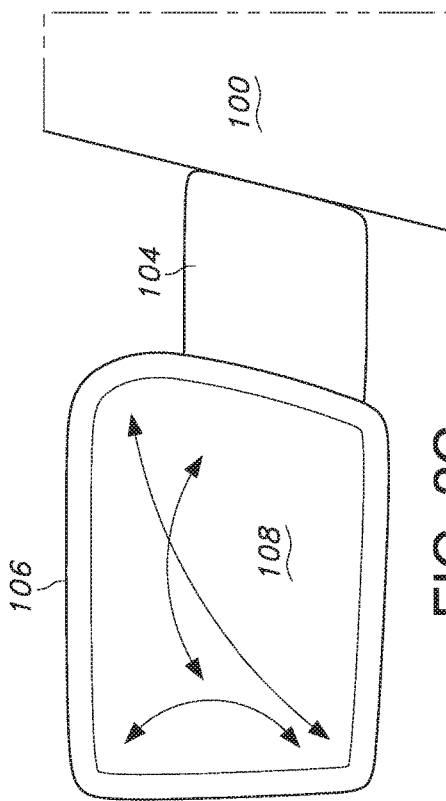
FIG. 2C shows a reflective surface of the extendable side view mirror of FIG. 1.

In turn, the mirror housing 106 carries a mirror reflective surface 108 which, as shown in FIG. 2C (see arrows), is configured for adjustment upwardly, downwardly, diagonally, etc. in order to adjust the reflective surface 108 and so the mirror field of view to a particular user's preference to see as wide a field rearwardly of the vehicle as possible. A number of manual and powered adjusting mechanisms for extending/retracting stalk 104 and for adjusting an orientation of mirror reflective surface 108 are available. Such mechanisms are well known in the art, and do not require extensive discussion herein.

Figure 3:
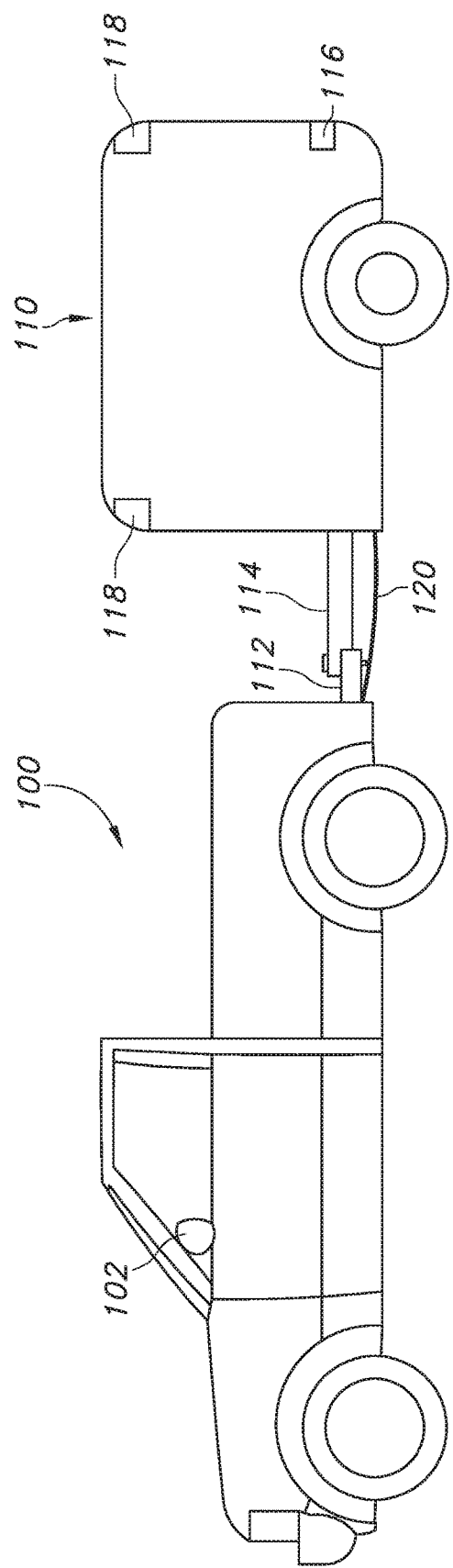
FIG. 3 shows a trailer attached to the vehicle of FIG. 1.

Conventionally, a user will hook a trailer 110 to vehicle 100 as shown in FIG. 3, such as by a vehicle trailer hitch 112 of substantially known design that attaches to a cooperating trailer coupler 114. Trailer electronics such as brake lights 116, running lights 118, brakes (not shown), and others are typically provided with electrical current supplied by a vehicle battery (not shown) by way of a wiring harness 120 which attaches at one end to a trailer wiring box (not shown) and at the opposed end plugs into the vehicle wiring. Again, such arrangements are well known in the art and do not require extensive description herein.

Prior to operating the vehicle 100 with the trailer 110 attached, the user will next configure the vehicle mirrors 102 to provide a desired field of view by extending the mirror stalks 104 and/or by altering the reflective surface 108 to a desired orientation as described above. In situations where a user tows a trailer 110 infrequently or tows one of multiple trailers 110 using the same vehicle 100, this process must inconveniently be repeated each time the user attaches a trailer to the vehicle.

Figure 4:
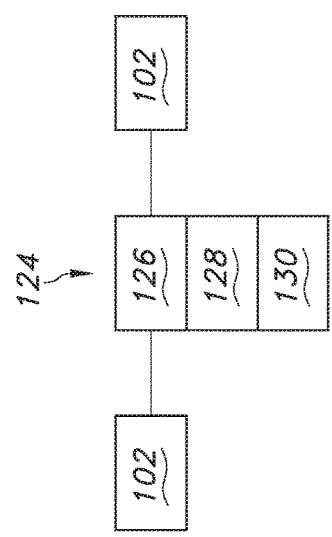
FIG. 4 schematically depicts a control system for an extendable side view mirror.

To solve this and other problems, with reference to FIG. 4 the present disclosure provides a side-view mirror control system 122 comprising at least one extendable side-view mirror 102 as described above operatively coupled to a controller 124 configured to control translation of the at least one mirror to one or more predetermined configurations. The controller 124 includes at least one processor 126, at least one memory 128, and storage 130. The controller 124 is further configured to store one or more predetermined or pre-stored mirror 102 configurations and also one or more predetermined or pre-stored trailer 110 indicia. The controller 124 may be a central vehicle controller, for example the vehicle BCU, or may be a dedicated micro-controller operatively associated with the mirrors 102 and optionally linked to a central vehicle controller such as the BCU.

The one or more predetermined or pre-stored mirror 102 configurations may be configurations set and stored by a user, defining mirror stalk 104 length and or mirror reflective surface 108 orientation as described above. These may be established by a user on first hooking up trailer 110 and stored in controller 124 as user pre-sets. Systems and mechanisms for storing pre-set vehicle configurations such as mirror orientations, seat placements, steering wheel height, etc. are well known in the art.

Figure 5:
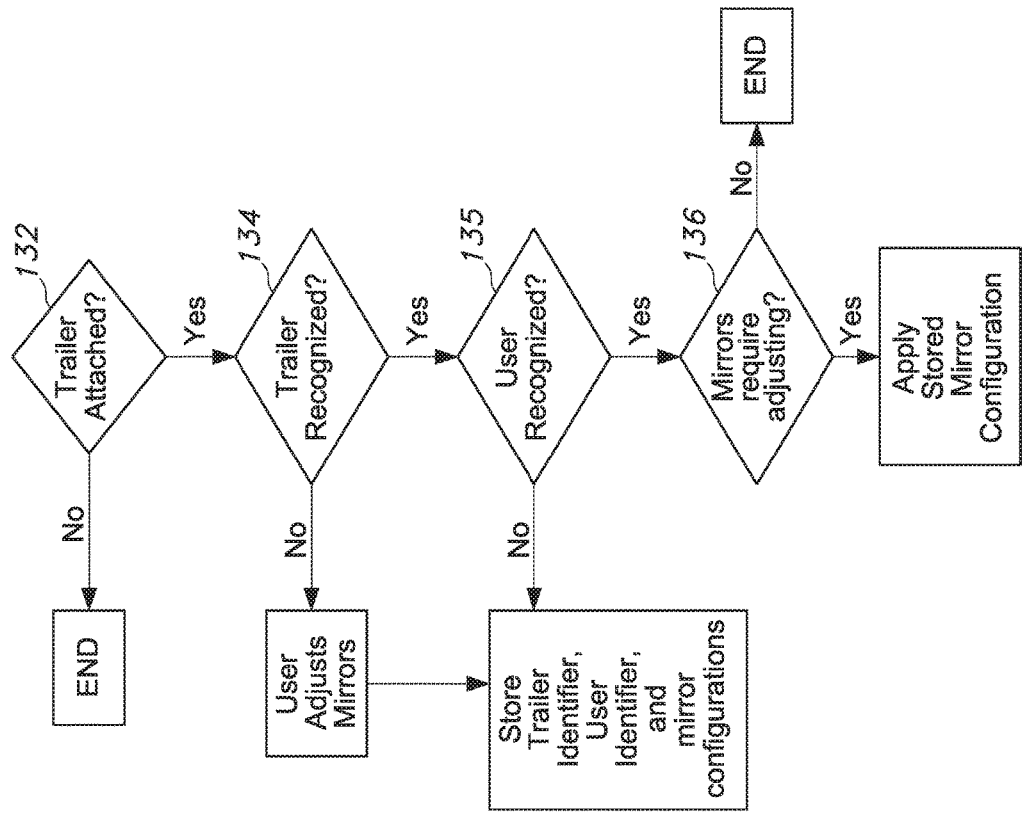
FIG. 5 depicts in flow chart form a method for translating an extendable side view mirror between one or more predetermined and stored configurations.

In an embodiment, the present disclosure provides a controller 124 configured to detect particular trailer 110 indicia indicative of a trailer previously towed by the vehicle 100 and for which mirror 102 predetermined configurations have been stored. As shown in FIG. 5, the process begins by controller 124 making a determination (step 132) of whether a trailer 110 is attached to the vehicle 100. This can occur via a signal transmitted through the wiring harness 120 in response to a query from the controller 124, via a wireless signal transmitted in response to a query from the controller 124, the signal transmitting from the trailer 110 to a receiver (not shown) operatively associated with the controller, or by other means such as a user actuating a button (not shown) after attaching the trailer to the vehicle.

Next, at step 134 it is determined whether the trailer 110 is recognized, i.e. whether the trailer has been towed by the vehicle 100 in the past and whether extendable side view mirror 102 settings have been stored by the controller 124. This can again occur by a signal transmitted through the wiring harness 120 in response to a query from the controller 124, or via a wireless signal transmitted in response to a query from the controller 124, the signal transmitting from the trailer 110 to a receiver (not shown) operatively associated with the controller. In one possible embodiment, it is contemplated to use the trailer identification system described in U.S. Published Patent Appl. No. 2015/0066296 to Trombley et al., the entirety of which is incorporated by reference herein. Broadly, the '296 reference describes a trailer identification system comprising a readable trailer tag including information regarding trailer parameters and/or a unique trailer identification code. Other potential parameters include trailer length, trailer width, trailer tongue length, and others. In one embodiment, the electronic tag is an RFID tag, and the vehicle 100 includes a suitable cooperating electronic reader operatively connected to the controller 124. In another embodiment, the tag is a Quick Response Code (QRC) and the reader is a vehicle-associated camera.

If the trailer 110 is recognized as having been previously towed by the vehicle 100, at step 136 the controller 124 identifies a predetermined mirror 102 configuration stored by the system and determines whether the mirrors require adjusting. If the mirrors 102 are already at a configuration determined by the system as being optimal for a particular trailer 110, no changes to the mirror configuration are made. If on the other hand the mirrors 102 require adjusting, the system applies the predetermined configuration. This can be done by the simple expedient of the controller 124 examining a lookup table including various stored trailer 110 unique identifiers and corresponding mirror 102 predetermined settings. The system selects the desired mirror 102 predetermined configuration and applies that configuration to the mirrors without requiring any user input.

The benefits of the presently disclosed systems and methods for configuring extendable side view mirrors 102 are apparent. By a system recognizing a particular trailer 110 and applying corresponding mirror 102 predetermined configurations according to that trailer unique identifier or trailer parameters, user input is not required. This eliminates the problem of a user attaching a trailer 110 to a vehicle 100 but forgetting to adjust the extendable side mirrors 102 prior to operating the vehicle. The system thus allows for near-automated adjustment of the vehicle mirrors 102 according to both particular trailer identifiers or parameters and user preference. That is, a user has pre-specified the mirror 102 extension and/or reflective surface 108 orientation according to his or her preference for a particular trailer 110. In future uses of the particular trailer 110, no user input is required to configure the mirror according to a user preference.

Obvious modifications and variations are possible in light of the above teachings. For example, more than one user may operate a particular vehicle 100. To account for this, the controller 124 may include, in addition to the unique trailer identifiers and corresponding mirror predetermined settings as described above, stored information regarding mirror preferences for multiple users. A particular user may be identified according to a particular user identifier (see Step 135 of FIG. 4), for example an identifier transmitted from a key fob or smartkey to the controller 124. In this embodiment, the controller 124 may examine a lookup table including various stored trailer 110 unique identifiers, user identifiers, and corresponding mirror 102 predetermined settings. The system then selects the desired mirror 102 predetermined configuration from the lookup table according to unique trailer identifier and user identifier, and applies that configuration to the mirrors, all without requiring any user input.

All such modifications and variations are within the scope of the appended claims when interpreted in accordance with the breadth to which they are fairly, legally and equitably entitled.

What is claimed:

1. A vehicle side-view mirror control system, comprising: a pair of extendable side-view mirrors; and a controller configured to receive and store one or more trailer identifying indicia that each define a specific trailer having been previously towed by the vehicle and one or more predetermined extendable side-view mirror configurations that each include a side-view mirror extension length; wherein the controller is configured to control translation of at least one of the pair of side-view mirrors to the side-view mirror extension length that corresponds to the one or more stored trailer identifying indicia.

2. The side-view mirror control system of claim 1, wherein the controller is operatively linked to at least one motor which drives the translation of the at least one of the pair of extendable side-view mirrors to the one of the predetermined configurations.

3. The side-view mirror control system of claim 1, wherein the one or more predetermined extendable side-view mirror configurations includes both the side-view mirror extension length and a side-view mirror reflective surface orientation.

4. The side-view mirror control system of claim 3, wherein the side-view mirror reflective surface orientation is determined according to the side-view mirror extension length.

5. The side-view mirror control system of claim 1, wherein the one or more predetermined extendable side-view mirror configurations are further keyed to a vehicle occupant identity.

6. The side-view mirror control system of claim 1, wherein the controller is configured to determine the one or more predetermined trailer identifying indicia by way of a communication between the trailer and the vehicle when the trailer is attached to the vehicle.

7. The side-view mirror control system of claim 6, wherein the communication is by a wired connection or is a wireless communication.

8. A vehicle including the side-view mirror control system of claim 1.

9. The side-view mirror control system of claim 1, wherein the controller is configured to control translation of the at least one of the pair of side-view mirrors to a second, different predetermined extension length that corresponds to the one or more trailer identifying indicia in response to detecting a different vehicle occupant operating the vehicle.

10. A method for controlling a vehicle extendable side-view mirror, comprising:
    communicating one or more trailer identifying indicia to a controller associated with the vehicle, wherein each of the one or more trailer identifying indicia define a specific trailer having been previously towed by the vehicle; and
    by the controller, translating at least one of a pair of extendable side-view mirrors to a predetermined extension length that corresponds to the one or more communicated trailer identifying indicia.

11. The method of claim 10, including operatively linking the controller to at least one motor which drives the translation of the at least one of the pair of extendable side-view mirrors to the predetermined configuration.

12. The method of claim 10, including translating the at least one of the pair of extendable side-view mirrors to the predetermined extension length and to a side-view mirror reflective surface orientation.

13. The method of claim 12, including determining the side-view mirror reflective surface orientation according to the side-view mirror extension length.

14. The method of claim 10, including further determining the predetermined configuration according to a vehicle occupant identity.

15. The method of claim 10, including determining, by the controller, the one or more communicated trailer identifying indicia by way of a communication between the trailer and the vehicle when the trailer is attached to the vehicle.

16. The method of claim 15, including providing the communication between the trailer and the vehicle by a wired connection or as a wireless communication.

17. The method of claim 10, comprising translating the at least one of the pair of extendable side-view mirrors to a second, different predetermined extension length that corresponds to the one or more trailer identifying indicia in response to detecting a different vehicle occupant operating the vehicle.

18. A vehicle side-view mirror control system, comprising:
- a pair of extendable side-view mirrors;
- a controller configured to receive and store one or more trailer identifying indicia that each define a specific trailer having been previously towed by the vehicle and one or more predetermined extendable side-view mirror configurations that each include a side-view mirror extension length; and
- at least one motor operatively linked to the controller and to the pair of extendable side-view mirrors;
- wherein the controller is configured to, by the at least one motor, control translation of the pair of side-view mirrors to the side-view mirror extension length that corresponds to the one or more stored trailer identifying indicia.

19. The side-view mirror control system of claim 18, wherein the one or more predetermined extendable side-view mirror configurations includes the side-view mirror extension length and a side-view mirror reflective surface orientation.

20. The side-view mirror control system of claim 18, wherein the one or more predetermined extendable side-view mirror configurations are further keyed to a vehicle occupant identity.

\* \* \* \* \*

UNITED STATES PATENT AND TRADEMARK OFFICE
CERTIFICATE OF CORRECTION

PATENT NO. : 9,919,652 B2
APPLICATION NO. : 15/146642
DATED : March 20, 2018
INVENTOR(S) : Michael Dupuis, David Joseph Orris and Thomas Lorenzo Page 1 of 1

It is certified that error appears in the above-identified patent and that said Letters Patent is hereby corrected as shown below:

In the Claims

In Claim 11, Column 6 Line 46; after "mirrors to" replace "the predetermined configuration" with --the predetermined extension length--

In Claim 14, Column 6 Line 56; before "according to a" replace "the predetermined configuration" with --the predetermined extension length--

Signed and Sealed this
Second Day of April, 2019

Andrei Iancu
*Director of the United States Patent and Trademark Office*